(12) United States Patent
Jung et al.

(10) Patent No.: US 8,978,073 B2
(45) Date of Patent: Mar. 10, 2015

(54) APPARATUS AND METHOD FOR PROVIDING MOBILE IPTV SERVICE IN MOBILE COMMUNICATION SYSTEM AND BROADCASTING SYSTEM

(75) Inventors: Young-Ho Jung, Gyeonggi-do (KR); So-Hee Park, Gyeonggi-do (KR)

(73) Assignee: Industry-University Cooperation Foundation Korea Aerospace University, Hwajeon-dong, Deokyang-gu, Goyang-si, Gyeonggi-do (KR)

( * ) Notice: Subject to any disclaimer, the term of this patent is extended or adjusted under 35 U.S.C. 154(b) by 498 days.

(21) Appl. No.: 13/104,237

(22) Filed: May 10, 2011

(65) Prior Publication Data

US 2011/0283326 A1    Nov. 17, 2011

(30) Foreign Application Priority Data

May 11, 2010  (KR) ......................... 10-2010-0043983

(51) Int. Cl.

| H04N 7/16 | (2011.01) |
|---|---|
| H04N 21/61 | (2011.01) |
| H04N 21/2343 | (2011.01) |
| H04N 21/4402 | (2011.01) |
| H04N 21/414 | (2011.01) |
| H04N 21/433 | (2011.01) |
| H04N 21/438 | (2011.01) |

(52) U.S. Cl.
CPC ... *H04N 21/6131* (2013.01); *H04N 21/234327* (2013.01); *H04N 21/440236* (2013.01); *H04N 21/41407* (2013.01); *H04N 21/4331* (2013.01); *H04N 21/4384* (2013.01)

USPC ............................... 725/62; 725/69; 725/109

(58) Field of Classification Search
CPC ............... H04N 21/234327; H04N 21/440236
USPC ............................................. 725/62, 109, 69
See application file for complete search history.

(56) References Cited

U.S. PATENT DOCUMENTS

| 8,565,083 | B2 * | 10/2013 | Kampmann et al. ........ 370/230.1 |
|---|---|---|---|
| 2004/0213214 | A1 * | 10/2004 | Jung et al. ..................... 370/352 |
| 2007/0067815 | A1 * | 3/2007 | Bowen et al. .................. 725/99 |
| 2008/0009285 | A1 * | 1/2008 | Cho et al. .................... 455/435.1 |
| 2008/0040743 | A1 * | 2/2008 | Dharmaji ........................ 725/35 |
| 2008/0069131 | A1 * | 3/2008 | Sakata et al. .................. 370/412 |
| 2011/0026470 | A1 * | 2/2011 | Joo et al. ....................... 370/329 |

FOREIGN PATENT DOCUMENTS

| KR | 10-2008-0113903 A | 12/2008 |
|---|---|---|
| KR | 10-2009-0008968 A | 1/2009 |
| KR | 10-0880569 B1 | 1/2009 |

* cited by examiner

*Primary Examiner* — Pankaj Kumar
*Assistant Examiner* — Sahar Baig
(74) *Attorney, Agent, or Firm* — Cha & Reiter, LLC

(57) ABSTRACT

In a mobile communication system and a broadcasting system, an Advanced Base Station (ABS) periodically broadcasts a buffering data packet of broadcast buffering content in providing a Mobile Internet Protocol TeleVision (Mobile IPTV) service. The broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to Advanced Mobile Stations (AMSs).

6 Claims, 7 Drawing Sheets

500
APPARATUS AND METHOD FOR PROVIDING MOBILE IPTV SERVICE IN MOBILE COMMUNICATION SYSTEM AND BROADCASTING SYSTEM

PRIORITY

This application claims the benefit under 35 U.S.C. §119 (a) of a Korean Patent Application filed in the Korean Intellectual Property Office on May 11, 2010 and assigned Serial No. 10-2010-0043983, the entire disclosure of which is hereby incorporated by reference.

BACKGROUND OF THE INVENTION

1. Field of the Invention

The present invention relates to an apparatus and method for providing a Mobile Internet Protocol TeleVision (Mobile IPTV) service in a mobile communication system and a broadcasting system.

2. Description of the Related Art

Wired IPTV systems provide real-time broadcast services and Video-on-Demand (VoD) services. The real-time broadcast services are provided using a plurality of real-time broadcast channels. When channel switching is made from the current real-time broadcast channel to a new real-time broadcast channel, a few seconds are required to receive data packets provided over the new real-time broadcast channel and decode the received data packets, causing a delay in the channel switching. Many different ways to minimize the switching time required for switching between real-time broadcast channels have been proposed, and a detailed description thereof will be made below.

Data packets being provided in real-time broadcast channels, such as adjacent real-time broadcast channels like the real-time broadcast channels whose channel numbers are just above and below a channel number of the current real-time broadcast channel presently providing a real-time broadcast service, or real-time broadcast channels whose channel numbers include a channel number corresponding to a specific number on a remote controller, which has been pushed by a user, are received in advance and then buffered. Thereafter, if channel switching is made from the current real-time broadcast channel to a new real-time broadcast channel, one of the adjacent real-time broadcast channels, the real-time broadcast channels may be switched without the switching delay.

In order to switch real-time broadcast channels without switching delay for all real-time broadcast channels, including the real-time broadcast channels whose channel numbers are just above and below a channel number of the current real-time broadcast channel, data packets corresponding to a predetermined buffering capacity should be received in advance and then buffered, for all the real-time broadcast channels provided by the wired IPTV systems.

As for the real-time broadcast channels, because data packets being provided over them may be decoded in advance through increases in hardware and computations of receivers, the switching time required for switching between the real-time broadcast channels is relatively short. However, in case of the VoD services, because the number of their available content channels is much greater than the number of real-time broadcast channels and it is difficult to predict which content channel a user will select, the time period required between the time the user selected a specific content channel and the time the specific content channel actually starts playing the content, is relatively long.

In the wired IPTV systems, in order to reduce the switching time required for switching between content channels, data packets being provided in content channels having a high correlation with the content being played in the current content channel are buffered in advance, and if new content channels, whose data packets have been buffered in advance, are selected, the data packets having been buffered are played immediately. This method will be described below with reference to FIG. 1.

FIG. 1 schematically illustrates a process of playing content upon switching of content channels in a general wired IPTV system.

The process, illustrated in FIG. 1, of playing content channels upon switching of content channels is a content playing process, in which for example, the content being played in the current content channel is a live baseball game in which a specific baseball player called 'Lion King' takes part, and channel switching is made to a content channel having a high correlation with the live baseball game, i.e., a new content channel in which videos of previous games, where the specific baseball player participated in, are played.

Referring to FIG. 1, while the current content channel plays a live baseball game of the specific baseball player, content having a high correlation with the content being played in the current content channel, for example, data packets provided in new content channels providing videos of previous games of the specific baseball player are buffered in advance.

As illustrated in FIG. 1, correlations between content being played in the current content channel and content to be played in the new content channels should be managed in a hierarchical manner to enable channel switching from the current content channel to the new content channels. However, in order to manage correlations between contents in a hierarchical manner, a database for the correlations between contents should be built, and additional overhead is required, such as transmission/reception of the correlation information.

Unlike the content channel switching method described in FIG. 1, a new method has been proposed, which switches content channels by buffering in advance data packets provided in new content channels existing in upper/lower tree menus of the menu in which the current content channel is included, using the characteristics that in case of VoD services, content thereof is likely to be selected according to the given menus.

Although the above-described real-time broadcast channel switching method and content channel switching method may reduce the switching time, unicast transmission or multicast transmission for transmitting data packets each user terminal will buffer in advance for the reduction in the switching time may continue to occur.

This continuous unicast transmission or multicast transmission is not a big problem in the wired environments where the sufficient transmission bandwidth and sufficient transfer rate may be guaranteed, like in the wired IPTV systems, so the real-time broadcast channel switching method and content channel switching method, in which the unicast transmission or multicast transmission continues to occur, may be used in the wired IPTV systems without significant problems.

However, if the real-time broadcast channel switching method and content channel switching method used in the wired IPTV systems are used in the wireless environments where the communication capacity and transmission bandwidth are limited, like in Mobile IPTV systems, use of which has been greatly increased recently, then the number of user terminals to which a Mobile IPTV service can be provided by the Mobile IPTV systems is limited due to an increase in the unicast transmission.

Therefore, the real-time broadcast channel switching method and content channel switching method used in the wired IPTV systems can hardly be used intact in the Mobile IPTV systems, leading to the necessity for a new real-time broadcast channel switching method and content channel switching method capable of minimizing the switching time.

SUMMARY OF THE INVENTION

An aspect of the present invention is to address at least the above-mentioned problems and/or disadvantages and to provide at least the advantages described below. Accordingly, an aspect of the present invention provides an apparatus and method for providing a Mobile IPTV service in a mobile communication system and a broadcasting system.

Another aspect of the present invention provides a Mobile IPTV service delivery apparatus and method for minimizing a switching time in a mobile communication system and a broadcasting system.

Further another aspect of the present invention provides a Mobile IPTV service delivery apparatus and method for minimizing a ratio of unicast transmission in a mobile communication system and a broadcasting system.

Yet another aspect of the present invention provides an apparatus and method for providing a Mobile IPTV service using a broadcast network and a mobile communication network together in a mobile communication system and a broadcasting system.

In accordance with one aspect of the present invention, there is provided a method for providing a Mobile Internet Protocol TeleVision (Mobile IPTV) service by an Advanced Base Station (ABS) in a mobile communication system and a broadcasting system. The method includes periodically broadcasting a buffering data packet of broadcast buffering content. The broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to Advanced Mobile Stations (AMSs).

In accordance with another aspect of the present invention, there is provided a method for providing a Mobile IPTV service by an Advanced Mobile Station (AMS) in a mobile communication system. The method includes receiving a buffering data packet of broadcast buffering content, which is periodically broadcasted. The broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to AMSs.

In accordance with another aspect of the present invention, there is provided an Advanced Base Station (ABS) for providing a Mobile IPTV service in a mobile communication system. The ABS includes a transmitter for periodically broadcasting a buffering data packet of broadcast buffering content. The broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to Advanced Mobile Stations (AMSs).

In accordance with further another aspect of the present invention, there is provided an Advanced Mobile Station (AMS) for providing a Mobile IPTV service in a mobile communication system. The AMS includes a receiver for receiving a buffering data packet of broadcast buffering content, which is periodically broadcasted. The broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to AMSs.

In accordance with yet another aspect of the present invention, there is provided a method for providing a Mobile IPTV service by a broadcast base station in a mobile communication system and a broadcasting system. The method includes periodically broadcasting a buffering data packet of broadcast buffering content. The broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to Advanced Mobile Stations (AMSs).

In accordance with still another aspect of the present invention, there is provided a broadcast base station for providing a Mobile IPTV service in a mobile communication system and a broadcasting system. The broadcast base station includes a transmitter for periodically broadcasting a buffering data packet of broadcast buffering content. The broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to Advanced Mobile Stations (AMSs).

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
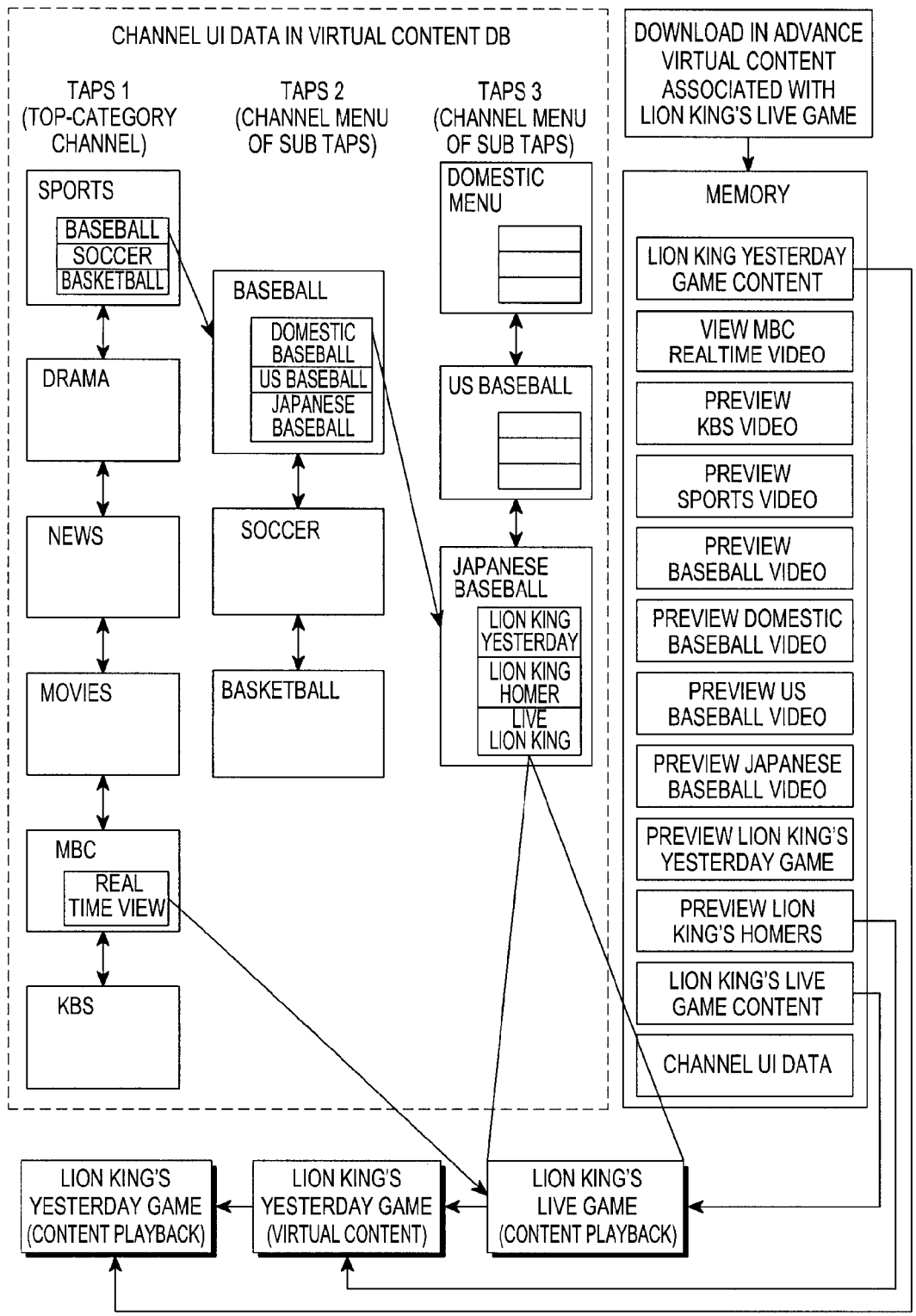
FIG. 1 is a diagram schematically illustrating a process of playing content upon switching of content channels in a general wired IPTV system.

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides an apparatus and method for providing a Mobile Internet Protocol TeleVision (Mobile IPTV) service in a mobile communication system and a broadcasting system. In addition, the present invention provides a Mobile IPTV service delivery apparatus and method for minimizing a switching time in a mobile communication system and a broadcasting system. Furthermore, the present invention provides a Mobile IPTV service delivery apparatus and method for minimizing a ratio of unicast transmission in a mobile communication system and a broadcasting system. Besides, the present invention provides an apparatus and method for providing a Mobile IPTV service using a broadcast network and a mobile communication network together in a mobile communication system and a broadcasting system.

An Institute of Electrical and Electronics Engineers (IEEE) 802.16m mobile communication system will be considered herein as an example of the mobile communication system. The Mobile IPTV service delivery apparatus and method proposed in the present invention may be used not only in the IEEE 802.16m mobile communication system, but also in various other mobile communication systems, including a $3^{rd}$ Generation Partnership Project 2 (3GPP2) mobile communication system using the 3GPP2 standard based on Code Division Multiple Access (CDMA), a $3^{rd}$ Generation Partnership Project (3GPP) mobile communication system using the 3GPP standard based on Wideband Code Division Multiple Access (WCDMA), a Worldwide Interoperability for Microwave Access (WiMAX) mobile communication system using the WiMAX Forum Network Working Group standard, and a Long Term Evolution (LTE) mobile communication system.

Given the following assumptions, the proposed Mobile IPTV service delivery apparatus and method is more effective.

In a first assumption, multicast transmission is higher in transmission efficiency than unicast transmission, and broadcast transmission is higher in transmission efficiency than multicast transmission.

In a second assumption, Advanced Mobile Stations (AMSs) are expected to be smaller in content capacity than the user thermals of the wired IPTV systems because of their limited display size.

In a third assumption, due to the continuous reduction in price of storage units such as flash memories, AMSs are likely to include a storage unit having a very high capacity of tens or hundreds of gigabytes.

Figure 2:
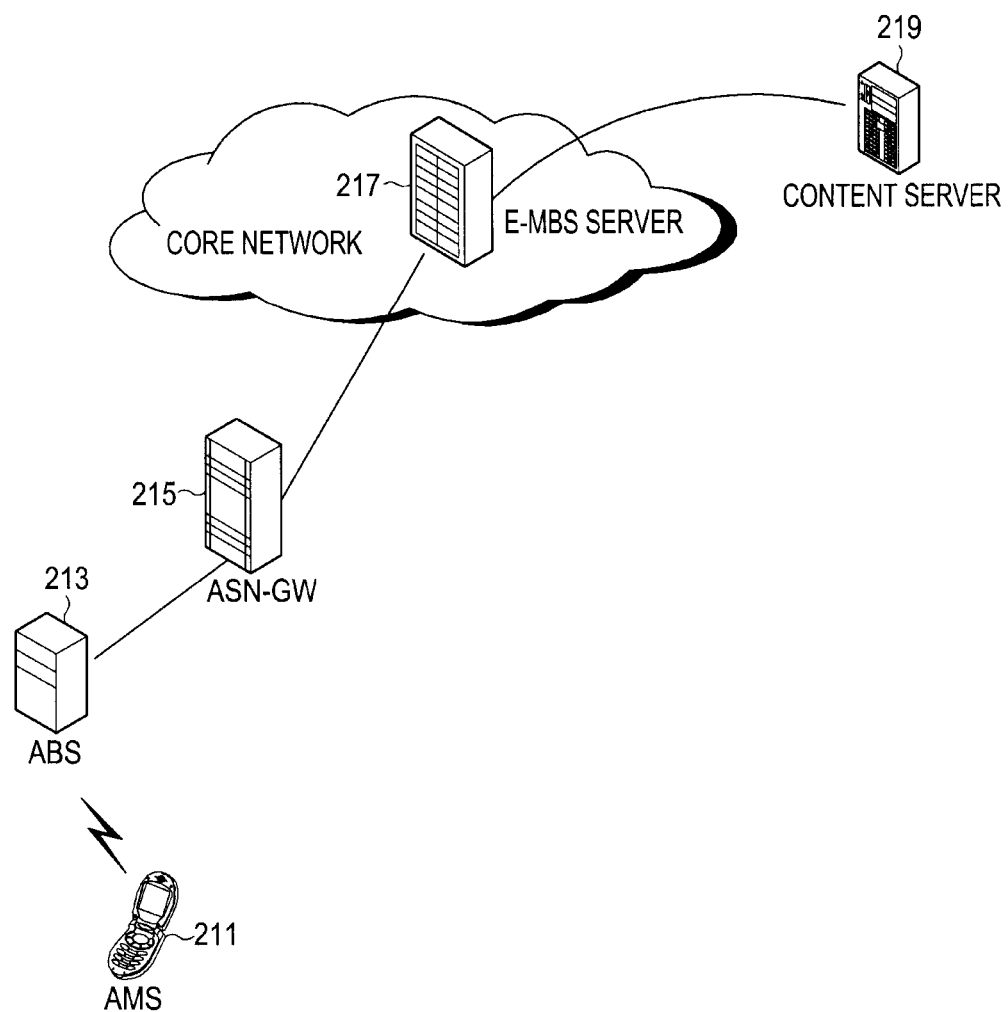
FIG. 2 is a diagram schematically illustrating configuration of an IEEE 802.16m mobile communication system according to an embodiment of the present invention.

FIG. 2 schematically illustrates configuration of an IEEE 802.16m mobile communication system according to an embodiment of the present invention.

Referring to FIG. 2, the IEEE 802.16m mobile communication system includes an AMS 211, an Advanced Base Station (ABS) 213, an Access Service Network-GateWay (ASN-GW) 215, an Enhanced-Multicast/Broadcast Service (E-MBS) server 217, and a content server 219.

A process of providing a Mobile IPTV service by an ABS in an IEEE 802.16m mobile communication system according to an embodiment of the present invention will be described with reference to FIG. 3.

Figure 3:
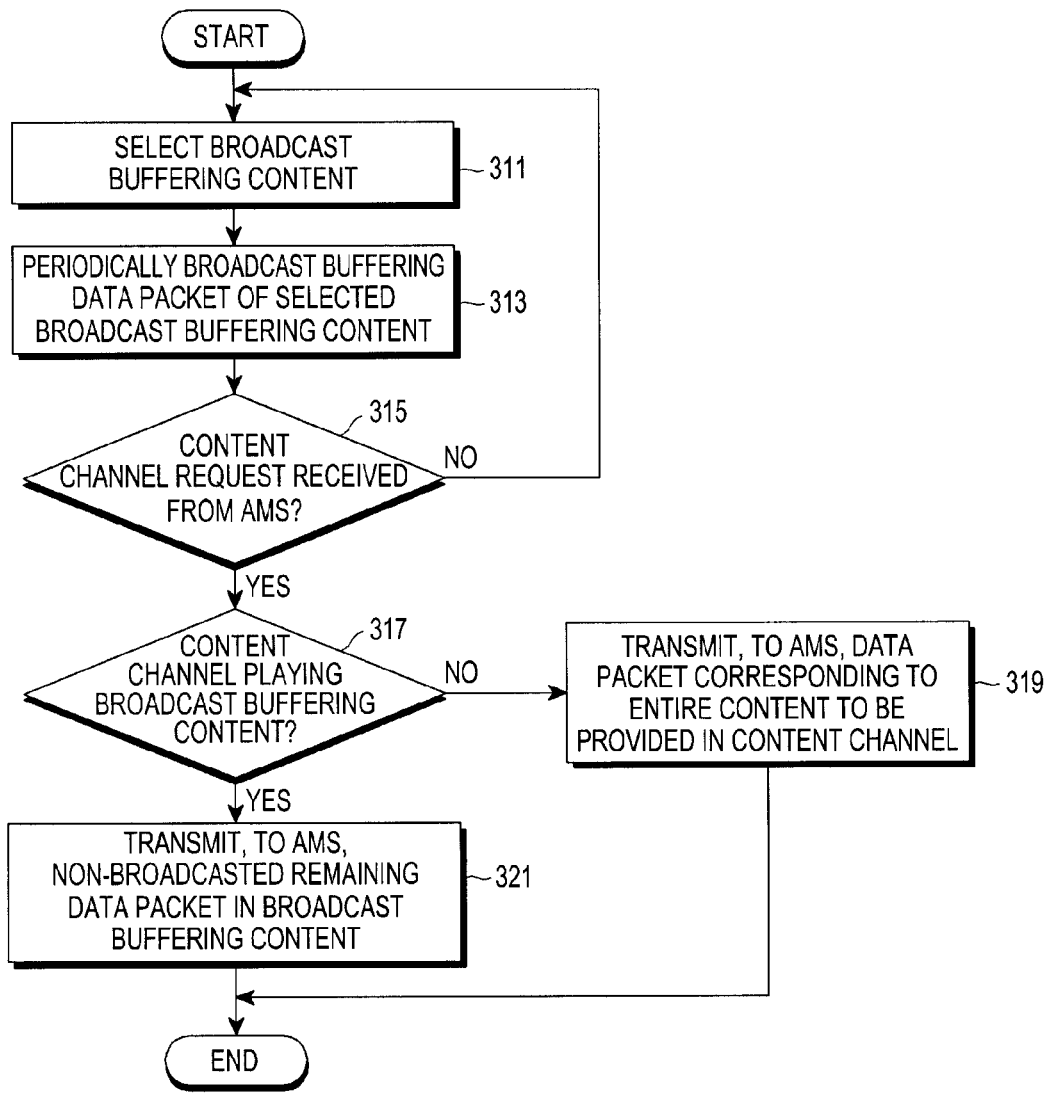
FIG. 3 is a flowchart illustrating a process of providing a Mobile IPTV service by an ABS in an IEEE 802.16m mobile communication system according to an embodiment of the present invention.

FIG. 3 illustrates a process of providing a Mobile IPTV service by an ABS in an IEEE 802.16m mobile communication system according to an embodiment of the present invention.

Referring to FIG. 3, the ABS selects broadcast buffering content according to the selection criteria predetermined by a Network Service Provider (NSP), in step 311. The 'broadcast buffering content' refers to content in which buffering data packets corresponding to a predetermined buffering capacity are periodically broadcasted by an ABS, and the 'buffering data packets' refers to data packets that are transmitted in order to be buffered in advance before the broadcast buffering content is actually provided to each AMS to reduce a switching time of content available in a Video-on-Demand (VoD) service.

In step 311, the NSP may determine the selection criteria such that content corresponding to the top menu on a menu tree provided in the Mobile IPTV service, or high-priority top-category content, such as popular movies, drama, news, and sports, may be selected as broadcast buffering content. The selection criteria are subject to change.

In step 313, the ABS periodically broadcasts buffering data packets corresponding to the buffering capacity, for the selected broadcast buffering content. The period, at which the buffering packets of the selected broadcast buffering content are broadcasted, is also subject to change. The ABS broadcasts the buffering data packets using multicast/broadcast channels, or broadcasts the buffering data packets using idle unicast channels among unicast channels.

In step 315, the ABS determines if a content channel request is received from an arbitrary AMS. If no content channel request is received from the AMS, the ABS returns to step 311. However, if a content channel request is received from the AMS, the ABS determines in step 317 whether a content channel corresponding to the received content channel request is a content channel playing broadcast buffering content.

If the content channel corresponding to the received content channel request is not a content channel playing broadcast buffering content, the ABS transmits data packets corresponding to the entire content needed to be provided in the content channel corresponding to the received content channel request, to the AMS in a unicast manner in step 319.

On the other hand, if the content channel corresponding to the received content channel request is a content channel playing broadcast buffering content, the ABS transmits the non-broadcasted remaining data packets in the broadcast buffering content to the AMS in a unicast manner in step 321.

Next, a process of providing a Mobile IPTV service by an AMS in an IEEE 802.16m mobile communication system according to an embodiment of the present invention will be described with reference to FIG. 4.

Figure 4:
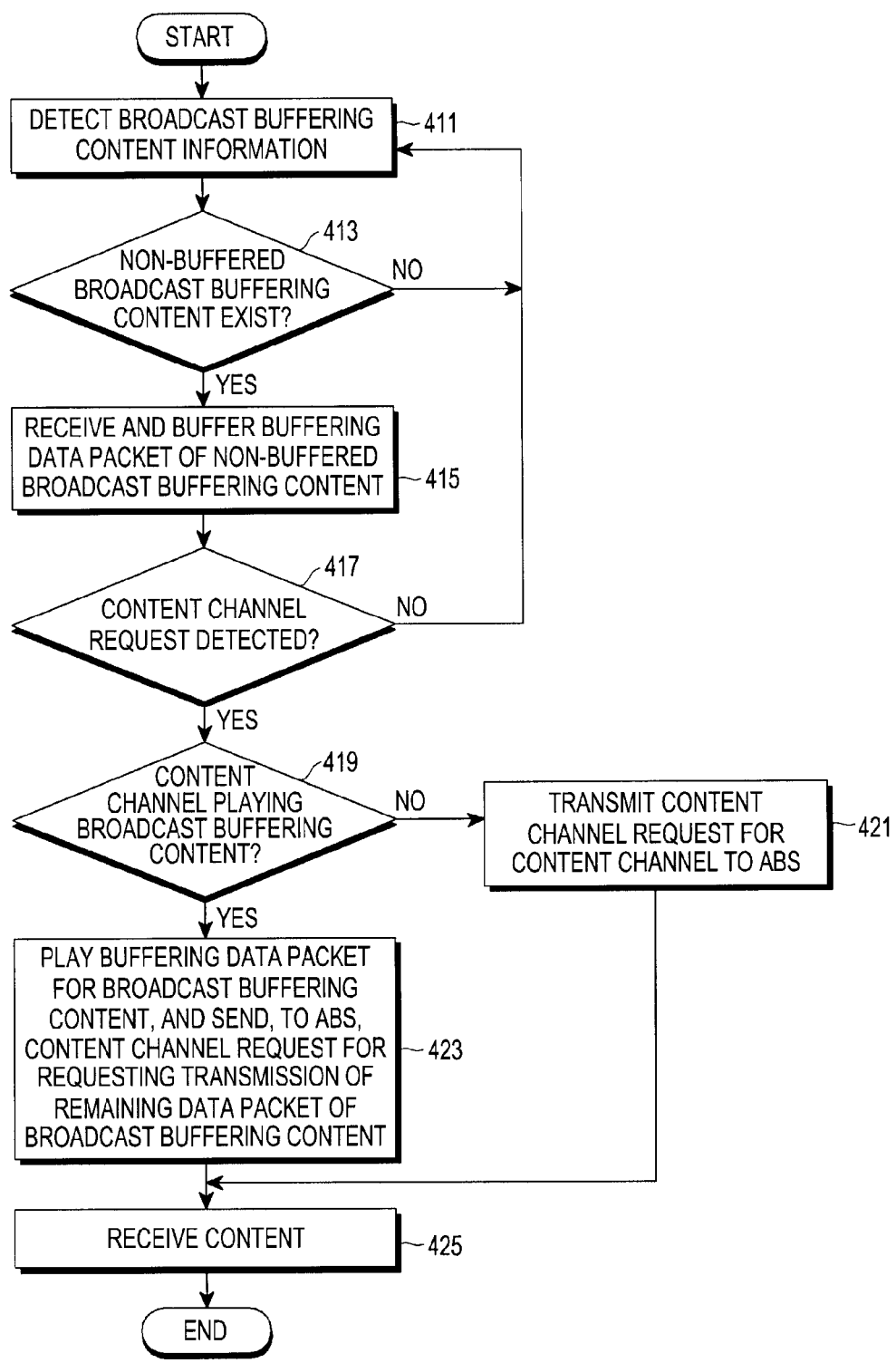
FIG. 4 is a flowchart illustrating a process of providing a Mobile IPTV service by an AMS in an IEEE 802.16m mobile communication system according to an embodiment of the present invention.

FIG. 4 illustrates a process of providing a Mobile IPTV service by an AMS in an IEEE 802.16m mobile communication system according to an embodiment of the present invention.

Referring to FIG. 4, the AMS detects broadcast buffering content information representing broadcast buffering content being broadcasted, using a MAP message in step 411. The MAP message will be described in detail below. In step 413, the AMS determines the presence/absence of non-buffered broadcast buffering content in the broadcast buffering content using the broadcast buffering content information. In the absence of the non-buffered broadcast buffering content, the AMS returns to step 411.

However, in the presence of the non-buffered broadcast buffering content, the AMS receives and buffers buffering data packets of the non-buffered broadcast buffering content in step 415. Location information of a resource region, or an E-MBS burst region, where buffering data packets of the broadcast buffering content are transmitted, is included in the MAP message, and the AMS receives and buffers buffering data packets of the non-buffered broadcast buffering content in the E-MBS burst region.

In step 417, the AMS determines if a content channel request is detected. If no content channel request is detected, the AMS returns to step 411.

On the other hand, if a content channel request is detected, the AMS determines in step 419 whether a content channel corresponding to the detected content channel request is a content channel playing broadcast buffering content. If the content channel corresponding to the detected content channel request is not a content channel playing broadcast buffering content, the AMS transmits a content channel request for a content channel corresponding to the detected content channel request, to an ABS in step 421, and then proceeds to step 425.

However, if the content channel corresponding to the detected content channel request is a content channel playing broadcast buffering content in step 419, the AMS plays buffering data packets having been buffered in advance for the broadcast buffering content corresponding to the content channel corresponding to the detected content channel request, and sends the ABS a content channel request for requesting transmission of the remaining data packets in the broadcast buffering content in step 423, and then proceeds to step 425.

In step 425, the AMS receives data packets provided in the content channel, from the ABS.

Continuing to receive and decode control messages such as the MAP message, and receiving buffering data packets of broadcast buffering content in order to receive buffering data packets even when there is no need for the remaining services other than the E-MBS service, may cause serious problems in terms of power saving of the AMS.

Therefore, information representing a transmission schedule of the broadcast buffering content should be transmitted intermittently in the buffering data packets. The information representing a transmission schedule of the broadcast buffering content will be assumed to be transmitted over a content MAP message.

In this case, the AMS is allowed to receive a content MAP message only at the time the content MAP message is transmitted, and to receive buffering data packets only at the transmission time of the buffering data packets of broadcast buffering content, which should be buffered according to the transmission schedule of broadcast buffering content, included in the received content MAP message. The AMS may be notified of the transmission time of the content MAP message by means of a separate broadcast message, or may be notified of the transmission time by a wake-up message before the content MAP message is transmitted. The content MAP message may be transmitted over an E-MBS burst region, which will be described below with reference to FIG. 5.

Figure 5:
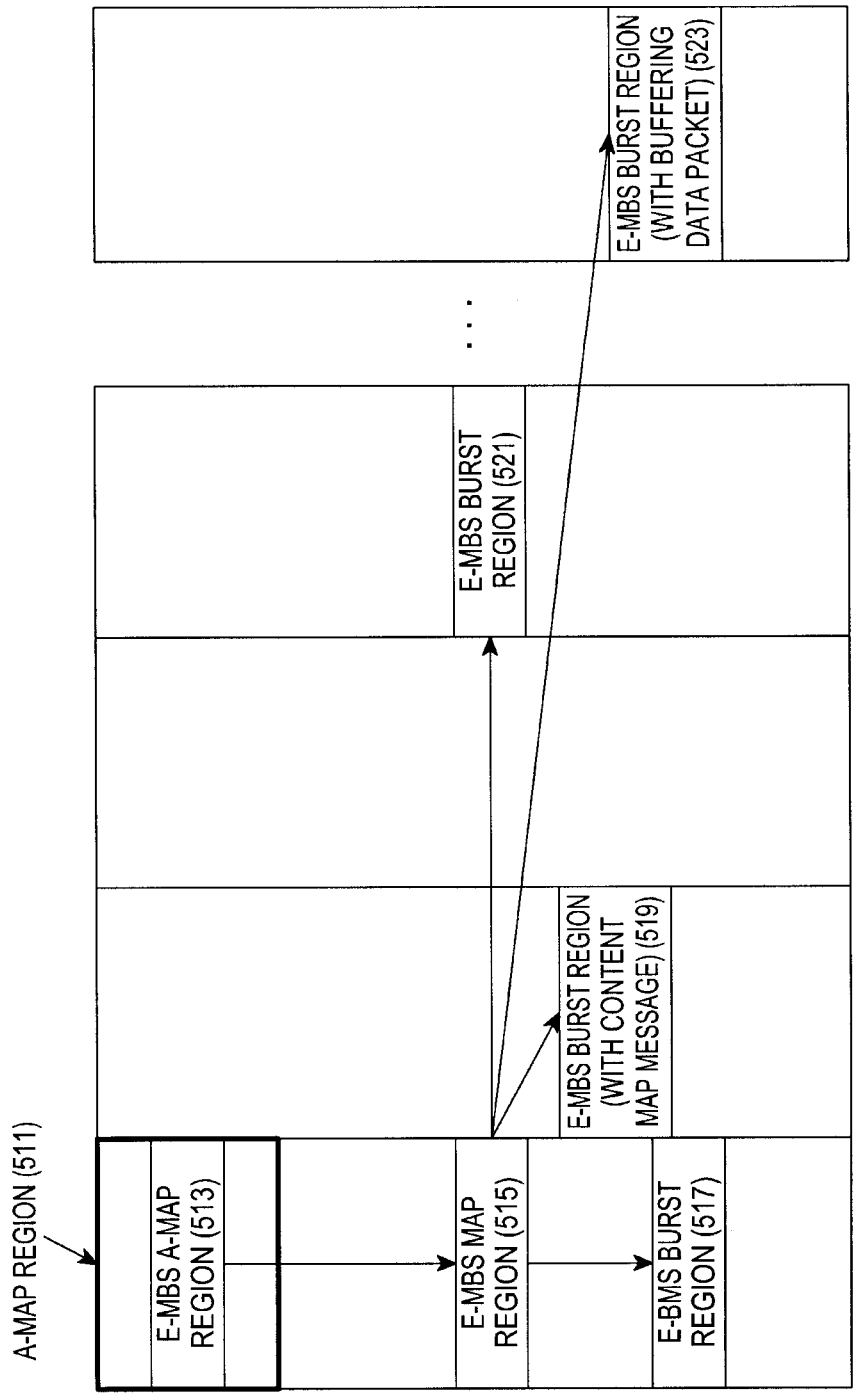
FIG. 5 is a diagram illustrating a structure of a frame in an IEEE 802.16m mobile communication system according to an embodiment of the present invention.

FIG. 5 illustrates a structure of a frame in an IEEE 802.16m mobile communication system according to an embodiment of the present invention.

Referring to FIG. 5, the frame includes an Advanced-MAP (A-MAP) region 511, an E-MBS MAP region 515, and E-MBS burst regions 517, 519, 521, and 523. The A-MAP region 511 includes an E-MBS A-MAP region 513.

The A-MAP region 511 is a region where A-MAP messages of the ABS are transmitted, and the E-MBS A-MAP region 513 is a region where E-MBS A-MAP messages associated especially with the E-MBS service are transmitted. Having decoded E-MBS A-MAP messages in the E-MBS A-MAP region 513, an AMS may detect information about the E-MBS MAP region 515. The E-MBS MAP region 515 is a region where an E-MBS MAP message is transmitted. The E-MBS MAP message includes resource allocation information for the E-MBS burst regions 517, 519, 521, and 523.

The AMS may detect resource allocation information for the E-MBS burst regions 517, 519, 521, and 523 by decoding the E-MBS MAP message, and receives data packets in the E-MBS burst regions 517, 519, 521, and 523.

A content MAP message is transmitted over an E-MBS burst region in the form of a data packet, and uses a Connection IDentifier (CID) for transmission of a content MAP message in order to identify whether the data packet is a content MAP. Thus, the AMS may determine that a data packet being transmitted using the CID for transmission of a content MAP message is a content MAP message.

Having received the content MAP message in the above manner, the AMS may detect a transmission schedule of broadcast buffering content. However, an AMS, which has already stored a large amount of content, should be able to easily determine whether it will receive and buffer only some of the buffering data packets, or whether the AMS is not required to receive buffering data packets being transmitted for a relevant period, because it has already received all of the necessary buffering data packets.

Therefore, in an embodiment of the present invention, version information of buffering data packets and information indicating certain fractions among the fractions that buffering data packets of the version include, are included in an E-MBS MAP message or a content MAP message, allowing the AMS to easily determine the necessity of receiving the buffering data packets without directly decoding the buffering data packets.

For example, it is assumed that the version information of buffering data packets is implemented with 4 bits, a fraction IDentifier (ID) is implemented with 8 bits, and all buffering data packets are divided into 256 fractions according to the content type or the location on the menu tree. In this case, if an ABS transmits a content MAP message including the 4-bit version information and the 8-bit fraction ID, an AMS may determine the necessity of receiving the buffering data packets, depending on the version information and the frame ID, making it possible to prevent a processing load caused by the unnecessary reception and decoding of buffering data packets.

Next, a process of providing a Mobile IPTV service using a broadcast network and a mobile communication network together in an IEEE 802.16m mobile communication system according to an embodiment of the present invention will be described with reference to FIG. 6.

Figure 6:
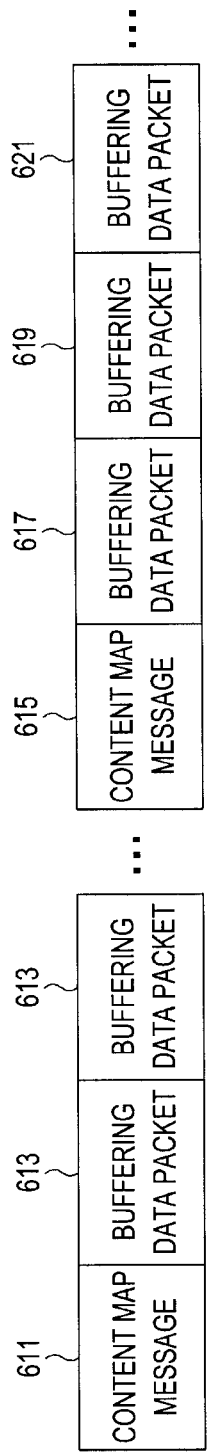
FIG. 6 is a diagram schematically illustrating a process of providing a Mobile IPTV service using a broadcast network and a mobile communication network together in an IEEE 802.16m mobile communication system according to an embodiment of the present invention.

FIG. 6 schematically illustrates a process of providing a Mobile IPTV service using a broadcast network and a mobile communication network together in an IEEE 802.16m mobile communication system according to an embodiment of the present invention.

Referring to FIG. 6, an AMS receives content MAP messages 611 and 619, and buffering data packets 613, 615, 617, 621, and 623 of broadcast buffering content through a broadcast channel of a broadcast network, and buffers the received MAP messages and data packets. The broadcasting network includes a broadcast base station, and the broadcast base station transmits content MAP messages and the buffering data packets 613, 615, 617, 621, and 623 of broadcast buffering content. Upon receiving a content channel request, the AMS receives the remaining data packets over a mobile communication network, while playing the buffering data packets having already been buffered, for the broadcast buffering content.

Next, an internal structure of an ABS in an IEEE 802.16m mobile communication system according to an embodiment of the present invention will be described with reference to FIG. 7.

Figure 7:
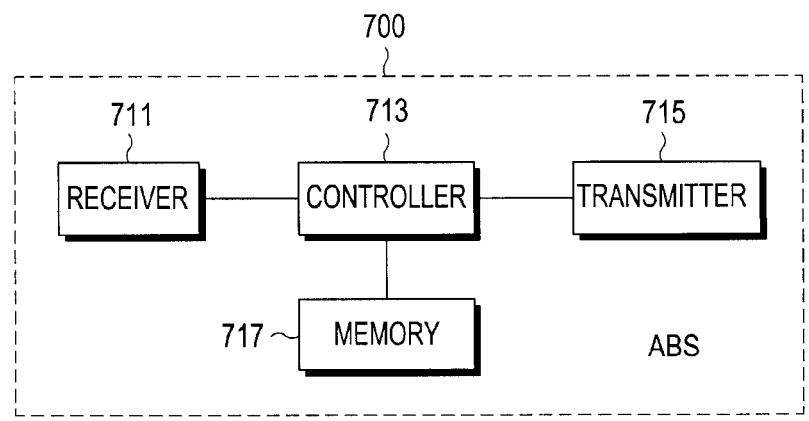
FIG. 7 is a diagram illustrating an internal structure of an ABS in an IEEE 802.16m mobile communication system according to an embodiment of the present invention.

FIG. 7 illustrates an internal structure of an ABS in an IEEE 802.16m mobile communication system according to an embodiment of the present invention.

Referring to FIG. 7, an ABS 700 includes a receiver 711, a controller 713, a transmitter 715, and a memory 717.

The controller 713 controls the overall operation of the ABS 700. Under control of the controller 713, the transmitter 715 transmits the E-MBS A-MAP message, E-MBS MAP message, content MAP message, buffering data packets of broadcast buffering content, and data packets of content, as described in connection with FIGS. 3 and 5. The memory 717 buffers various data required for an operation of the ABS 700, and also buffers the E-MBS A-MAP message, E-MBS MAP message, content MAP message, buffering data packets of broadcast buffering content, and data packets of content. The receiver 711 receives a content channel request from an AMS.

While the receiver 711, the controller 713, the transmitter 715, and the memory 717 are implemented as separate units in the internal structure of the ABS 700 in FIG. 7 by way of example, the receiver 711, the controller 713, the transmitter 715, and the memory 717 may be implemented in a single unit.

Although not separately illustrated, the broadcast base station includes a controller, a transmitter, and a memory. The controller controls the overall operation of the broadcast base station. Under control of the controller, the transmitter transmits content MAP messages and buffering data packets of broadcast buffering content, and the memory buffers various data required for an operation of the broadcast base station, and also buffers the content MAP messages and buffering data packets of broadcast buffering content. Likewise, the controller, the transmitter, and the memory may be implemented as separate units, or may be implemented in a single unit.

Next, an internal structure of an AMS in an IEEE 802.16m mobile communication system according to an embodiment of the present invention will be described with reference to FIG. 8.

Figure 8:
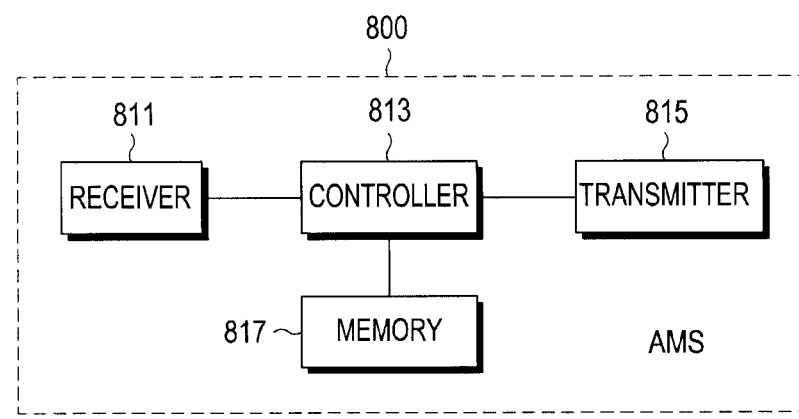
FIG. 8 is a diagram illustrating an internal structure of an AMS in an IEEE 802.16m mobile communication system according to an embodiment of the present invention.

FIG. 8 illustrates an internal structure of an AMS in an IEEE 802.16m mobile communication system according to an embodiment of the present invention.

Referring to FIG. 8, an AMS 800 includes a receiver 811, a controller 813, a transmitter 815, and a memory 817.

The controller 813 controls the overall operation of the AMS 800. Under control of the controller 813, the transmitter 815 transmits a content channel request to an ABS as described in connection with FIG. 4. Under control of the controller 813, the receiver 811 receives, from the ABS, an E-MBS A-MAP message, an E-MBS MAP message, a content MAP message, buffering data packets of broadcast buffering content, and data packets of content. The memory 817 buffers various data required for an operation of the AMS 800, and also buffers the E-MBS A-MAP message, the E-MBS MAP message, the content MAP message, the buffering data packets of broadcast buffering content, and the data packets of content.

While the receiver 811, the controller 813, the transmitter 815, and the memory 817 are implemented as separate units in the internal structure of the AMS 800 in FIG. 8 by way of example, the receiver 811, the controller 813, the transmitter 815, and the memory 817 may be implemented in a single unit.

As is apparent from the foregoing description, the present invention may minimize the switching time during a Mobile IPTV service in a mobile communication system and a broadcasting system.

In addition, the present invention may minimize a ratio of unicast transmission during a Mobile IPTV service in a mobile communication system and a broadcasting system, thereby maximizing resource efficiency.

Besides, the present invention may provide a Mobile IPTV service using a broadcast network and a mobile communication network together in a mobile communication system and a broadcasting system, thereby minimizing the amount of wireless resources used for the Mobile IPTV service.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a Mobile Internet Protocol Television (Mobile IPTV) service by an Advanced Base Station (ABS) in a mobile communication system and a broadcasting system, comprising:

periodically broadcasting a buffering data packet of broadcast buffering content;

upon receiving a content channel request from an arbitrary Advanced Mobile Station (AMS), determining whether a content channel corresponding to the content channel request is a content channel included in the broadcast buffering content;

in response to the content channel corresponding to the content channel request being a content channel included in the broadcast buffering content, transmitting, to the arbitrary AMS, remaining data packets except for the buffering data packet in broadcast buffering content being played in the content channel corresponding to the content channel request; and in response to the content channel corresponding to the content channel request not being a content channel included in the broadcast buffering content, transmitting, to the arbitrary AMS, data packets corresponding to the entire content being played in the content channel corresponding to the content channel request, wherein the broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to AMSs, wherein the periodically broadcasting the buffering data packet comprises:

transmitting a control message that includes a resource region in which a content MAP message representing information about a transmission schedule of the buffering data packet is transmitted, and information needed for decoding; and transmitting the buffering data packet in resource regions corresponding to the transmission schedule of the buffering data packet.

2. The method of claim 1, wherein the transmitting remaining data packets comprises transmitting the remaining data packets to the AMS in a unicast or multicast manner; and wherein the transmitting data packets corresponding to the entire content comprises transmitting the data packets corresponding to the entire content to the AMS in a unicast or multicast manner.

3. An Advanced Base Station (ABS) for providing a Mobile Internet Protocol TeleVision (Mobile IPTV) service in a mobile communication system, comprising:

a transmitter for periodically broadcasting a buffering data packet of broadcast buffering content;

a receiver for receiving a content channel request from an arbitrary to an Advanced Mobile Station (AMS); and a controller for, determining whether a content channel corresponding to the content channel request is a content channel included in the broadcast buffering content:

in response to the content channel corresponding to the content channel request being a content channel included in the broadcast buffering content, controlling the transmitter to transmit, to the arbitrary AMS, remaining data packets except for the buffering data packet in broadcast buffering content being played in the content channel corresponding to the content channel request; and in response to the content channel corresponding to the content channel request not being a content channel included in the broadcast buffering content, controlling the transmitter to transmit, to the arbitrary AMS, data packets corresponding to the entire content being played in the content channel corresponding to the content channel request, wherein the broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to AMSs, wherein the transmitter transmits a control message that includes a resource region in which a content MAP message representing information about a transmission schedule of the buffering data packet is transmitted, and information needed for decoding, and the transmitter transmits the buffering data packet in resource regions corresponding to the transmission schedule of the buffering data packet.

4. The ABS of claim 3, wherein the transmitter transmits the remaining data packets to the AMS in a unicast or multicast manner; and the transmitter transmits the data packets corresponding to the entire content to the AMS in a unicast or multicast manner.

5. A method for providing a Mobile Internet Protocol TeleVision (Mobile IPTV) service by a broadcast base station in a mobile communication system and a broadcasting system, comprising:

periodically broadcasting a buffering data packet of broadcast buffering content;

wherein the broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to Advanced Mobile Stations (AMSs), and wherein the periodically broadcasting a buffering data packet comprises:

transmitting a content MAP message representing information about a transmission schedule of the buffering data packet; and transmitting the buffering data packet depending on the transmission schedule of the buffing data packet.

6. A broadcast base station for providing a Mobile Internet Protocol TeleVision (Mobile IPTV) service in a mobile communication system and a broadcasting system, comprising:

a transmitter for periodically broadcasting a buffering data packet of broadcast buffering content;

wherein the broadcast buffering content represents content in which a buffering data packet corresponding to a predetermined buffering capacity is periodically broadcasted, and the buffering data packet represents a data packet that is transmitted to be buffered in advance before the broadcast buffering content is actually provided to Advanced Mobile Stations (AMSs), and wherein the transmitter transmits a content MAP message representing information about a transmission schedule of the buffering data packet and information needed for decoding, and the transmitter transmits the buffering data packet depending on the transmission schedule of the buffering data packet.

\* \* \* \* \*

UNITED STATES PATENT AND TRADEMARK OFFICE
CERTIFICATE OF CORRECTION

PATENT NO.        : 8,978,073 B2                    Page 1 of 1
APPLICATION NO.   : 13/104237
DATED             : March 10, 2015
INVENTOR(S)       : Young-Ho Jung et al.

It is certified that error appears in the above-identified patent and that said Letters Patent is hereby corrected as shown below:

In the Claims

Column 11, Claim 3, Line 31 should read as follows:
--...An Advanced Base Station...--

Column 11, Claim 3, Lines 41-42 should read as follows:
--...buffering content; in response...--

Column 12, Claim 5, Line 37 should read as follows:
--...the buffering data packet...--

Signed and Sealed this
Ninth Day of June, 2015

Michelle K. Lee
*Director of the United States Patent and Trademark Office*